INVENTOR

James D. Durkee

BY Burns, Doane, Benedict & Irons

ATTORNEYS

INVENTOR
James D. Durkee
BY Burns, Doane, Benedict & Irons
ATTORNEYS

INVENTOR
James D. Durkee

BY Burns, Doane, Benedict + Irons

ATTORNEYS

June 7, 1960

J. D. DURKEE 2,939,912

ALTERNATE TONE RECEIVER AND METHOD OF SIGNAL TRANSMISSION AND RECEPTION

Original Filed Aug. 7, 1953

4 Sheets-Sheet 4

INVENTOR

James D. Durkee

BY Burns, Doane, Benedict & Irons

ATTORNEYS

United States Patent Office 2,939,912

Patented June 7, 1960

2,939,912

ALTERNATE TONE RECEIVER AND METHOD OF SIGNAL TRANSMISSION AND RECEPTION

James D. Durkee, Gravette, Ark., assignor, by mesne assignments, to Bell & Gossett Company, Morton Grove, Ill., a corporation of Illinois Continuation of application Ser. No. 372,907, Aug. 7, 1953. This application Aug. 29, 1958, Ser. No. 758,652

23 Claims. (Cl. 178—34)

The present invention relates to alternate tone transmission and reception of functional signals such as the signals used in printing telegraph systems and to a method ofg signal transmission and reception.

This application is a continuation of application Serial No. 372,907, filed August 7, 1953, now abandoned.

The invention is concerned with a method and apparatus for transmitting and receiving alternate tones as a signal, each tone consisting of a single frequency. Each signal to be transmitted is compressed or converted into a conventional five-unit code. Thus, each functional intelligible signal, as for example each letter of the alphabet, is represented by a unit or combination of units of a five-unit code such as the Baudot code. The five-unit code is then arbitrarily separated into two components, of preferably two elements in one of the components and three elements in the other component. A matrix is provided for expanding the two-element component by binary progression into a group of four parts. A second matrix expands the three-element component by binary progression into a group of eight parts. Such binary progression has reference to a geometric progression or series wherein the parts progress in relation to one another by a constant factor of two, as for example one, two, four, eight. Individual single frequencies are provided for each part of each group. A single frequency is selected from the four-part group and a single frequency is selected from the eight-part group to form a character or signal. The single frequency selected from the four-part group and the single frequency selected from the eight-part group are individually transmitted in sequence to provide first and second signal phases, each phase consisting of a single frequency. The five-unit code need not be divided into components consisting of two and three elements, although this is preferred and the invention will be thus illustrated and described. The five-unit code could be arbitrarily separated into components of one and four elements and in that case the one-element component would be expanded by a matrix into two parts and the four-element component would be expanded by a second matrix into 16 parts. In either event, the arrangement permits transmission of 32 functional signals.

The system is, strictly speaking, an alternate tone system as distinguished from either a simultaneous tone or sequential tone system. There are many advantages in using my alternate tone system over the systems heretofore used. In the simultaneous tone system, a plurality of tones or frequencies are superimposed on each other and are transmitted simultaneously as a composite signal. The total power in the composite signal must be distributed among the number of frequencies or tones constituting the signal. Furthermore, due to selective fading and other atmospheric phenomena, the possibility exists for loss of power in one or more of the tones constituting the signal. Loss of a component of the simultaneous signal results in erroneous reception.

In a sequential system, a plurality of different impulses are transmitted one after the other. In such sequential systems, the different impulses must be synchronized or positioned with respect to time in both the transmitter and the receiver in order to permit the series of impulses to accomplish their purpose. This necessity for synchronization of the transmitter and receiver places severe limitations on the rate of transmission and on the compatibility of sequential systems with systems of other types or of different synchronizing rates.

My alternate tone system transmits and receives single frequencies or pure tones during each signal phase. I thus greatly reduce the possibility of loss of information in signal transmission and I thereby reduce the likelihood of erroneous reception. The transmission and reception of a single frequency at any one time permits the different frequencies to have values relatively close together and the wave band can be rather narrow. My alternate tone system requires no synchronization with respect to time between the transmitter and the receiver. In my system there is not, strictly speaking, an off time, or at least an off time is not required. My system provides a two-phase signal which can use all of the available time. The first phase of my signal is transmitted and received and is immediately followed by the second phase of the signal. It might be stated that the second phase of my signal can be transmitted and received during the time interval which would be the space or off time in any sequential or "on" and "off" system. The second phase of my signal may be followed immediately by the first phase of the next signal. A basic distinction between my alternate tone system and a sequential system resides in the fact that in the sequential system the off time or spacing impulse always means the same thing, whereas in my system there is no off time and the first and second phases of the signal mean different things, thus making it possible to transmit bits of intelligence during each signal phase. In my system, the execution of the printing function is initiated in the second phase of the signal and may be completed in the first phase of the succeeding signal. Thus, the full time of each signal phase may be utilized for the essential function of determining the intelligence or information contained therein.

My alternate tone system retains compatibility with the existing five-unit teleprinter code. In other words, my transmitter can be directly keyed with the existing conventional five-unit code keyboard and the received signal can be reconverted into its original five units and used on conventional teleprinters by the use of a suitable converter.

The primary objects of my invention are to provide an improved system of signal transmission and reception which retains compatibility with existing systems, which is capable of utilizing all the time available during each signal transmission for the essential function of determining the intelligence or information contained in the signal, which permits use of a narrow wave band, which reduces the possibility of loss of signal components in transmission, and which requires no synchronization as between the transmitter and the receiver. Another object of the invention is to provide a signalling system which can be operated at any desired speed of transmission and which overcomes the present necessity of transmitting only at a fixed rate.

Still another object of the invention is to provide a method and apparatus for signal transmission and reception which involves converting the character to be transmitted into a five-unit code, arbitrarily separating the five-unit code into a first component of at least one code unit and a second component of the remaining code units, expanding the first component into a first group of parts, expanding the second component into a second group of parts, assigning individual frequency identities to each part of each group, alternately transmitting a single part from the first group and a single part from the second group as first and second signal phases, receiving the signal phases, utilizing the first signal phase at the receiver to perform part of the operations necessary to recordation of the signal transmitted, and utilizing the second phase of the signal at the receiver to complete the operations necessary to recordation of the signal.

Other objects and advantages of the invention will be pointed out in the following detailed description of an exemplary embodiment of the invention. This description has reference to the accompanying drawings, wherein.

*Description of the transmitter*

Figure 1:
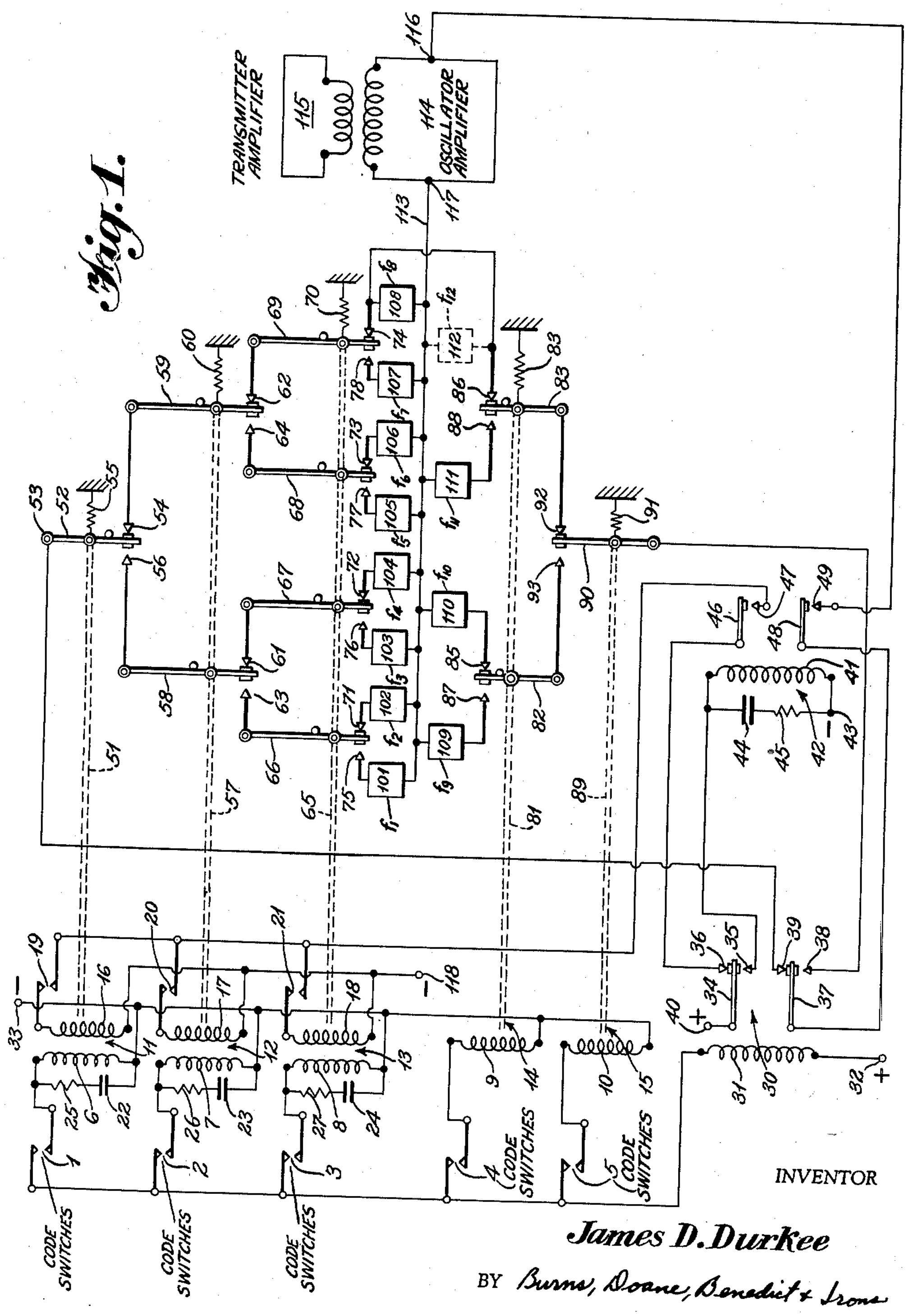
Figure 1 is a wiring diagram of a transmitter, all contacts being shown in the positions which they occupy when the relays are not energized.

The transmitter illustrated in Figure 1 is described and particularly claimed in my co-pending application Serial No. 348,260, filed April 13, 1953.

The reference numerals 1, 2, 3, 4 and 5 designate switches which may be actuated by a keyboard, such as that illustrated in my copending application Serial No. 309,033, filed September 11, 1952, entitled "Printer For Communications Systems," now Patent 2,742,532. Various combinations of the switches 1 to 5 are closed on depression of keys of the keyboard. Alternatively, the switches 1 to 5 may be the contacts of a tape transmitter unit of the kind currently used in teleprinter operations. In the tape transmitter unit, various combinations of the switches 1 to 5 will be closed on passage of a perforated tape through the unit.

The reference numerals 6, 7, 8, 9 and 10 designate the individual operating coils of a series of relays which are designated generally by the reference numerals 11, 12, 13, 14 and 15. The relays 11, 12 and 13 are provided with locking coils 16, 17 and 18, respectively, these locking coils being wound on the same pole pieces as the coils 6, 7 and 8. The relay 11 is provided with contacts 19 which close on energization of the relay for closing a circuit to the locking coil 16. The relays 12 and 13 are similarly provided with contacts 20 and 21 for closing the circuits to the locking coils 17 and 18, respectively. Relay 11 is provided with a capacitor 22 which is connected in parallel with the coil 11. Relays 12 and 13 are provided with similarly connected capacitors 23 and 24. The relays 11, 12 and 13 are also provided with current-limiting resistors 25, 26 and 27 which are in series connection with the capacitors 22, 23 and 24, respectively.

The relay which is designated generally by the reference numeral 30 is provided with an operating coil 31 which is connected in series with the contacts 1, 2, 3, 4, and 5 between a positive voltage source 32 and the operating coils 6, 7, 8, 9 and 10. The negative voltage source is indicated at 33. The relay 30 will be energized when any one of the contacts 1 to 5 or any combination of those contacts are closed to pass current through any one or any combination of the operating coils 6 to 10, inclusive. The relay 30 is of the double-pole-double-throw type. The armature 34 engages contact 35 when the relay 30 is energized and engages contact 36 when the relay is deenergized. Armature 37 engages contact 38 when the relay 30 is energized and engages contact 39 when the relay is deenergized. Engagement of the contact 35 by the armature 34 causes current to flow from a positive voltage source 40 to the operating coil 41 of a relay which is designated generally by the reference numeral 42. The current passes from the operating coil 41 to a negative voltage source 43. A capacitor 44 and a current-limiting resistor 45 serve to keep the relay 42 energized for a controllable time period after the armature 34 has disengaged the contact 35. The armature 46 engages contact 47 when the relay 42 is energized, and armature 48 engages contact 49 when that relay is energized.

The reference numeral 51 diagrammatically designates the armature of the relay 11. Contact arm 52 is pivotally mounted at 53 and is urged into engagement with the contact 54 by means of a spring 55 when the relay 11 is not energized. Energization of the relay 11 causes the contact arm 52 to engage the contact 56. The armature of the relay 12 is designated by the reference numeral 57 and controls contact arms 58 and 59. A spring member 60 urges the contact arm 58 into engagement with the contact 61 and urges the contact arm 59 into engagement with the contact 62 when the relay 12 is not energized. Energization of the relay 12 causes the contact arm 58 to engage the contact 63 and also causes the contact arm 59 engages the contact 64. The armature of relay 13 is designated by the reference numeral 65 and is used to control contact arms 66, 67, 68 and 69. When the relay 13 is not energized, a spring member 70 urges the contact arms 66, 67, 68 and 69 into engagement with the contacts 71, 72, 73 and 74, respectively. Energization of the relay 13 causes the contact arms 66, 67, 68 and 69 to engage contacts 75, 76, 77 and 78, respectively.

The armature of relay 14 is designated by the reference numeral 81 and is used to control contact arms 82 and 83. When the relay 14 is not energized, a spring member 84 urges the contact arm 82 into engagement with the contact 85 and also urges the contact arm 83 into engagement with the contact 86. Energization of the relay 14 causes the contact arm 82 to engage the contact 87 and causes the contact arm 83 to engage the contact 88. The relay 15 is provided with an armature 89 which controls the position of a contact arm 90. A spring member 91 urges the contact arm 90 into engagement with the contact 92 when the relay 15 is not energized. Energization of the relay 15 causes the contact arm 90 to engage the contact 93.

The reference numerals 101, 102, 103, 104, 105, 106, 107, 108, 109, 110, 111 and 112 designate individual audio-frequency-determining elements. These frequency-determining elements may be individual audio oscillators of different frequencies or they may be frequency-controlling components of a master audio-oscillator, as will be apparent to those skilled in the art. For purposes of further discussion, it will be assumed that the frequency-determining means 101 to 112 are individual oscillators which are connected by means of a common line 113 to an audio-amplifier 114. As indicated above, the numeral 114 may designate a master audio-oscillator whose frequency is determined by the value of frequency-determining components corresponding to the individual oscillators 101 to 112. The reference numeral 115 designates a line amplifier or the modulating system of a radio frequency transmitter.

*Operation of the transmitter*

For the purpose of describing the operation of the transmitter, it will be assumed that it is desired to transmit the letter "Y." Depression of the "Y" key at the keyboard will close the contacts 1, 3 and 5. Alternatively, the contacts 1, 3 and 5 may be closed by a tape transmitter. Closing of these contacts causes current to flow from the positive voltage source 32 through the coil 31 of relay 30 and through the coils 6, 8 and 10 of relays 11, 13 and 15 to the negative voltage source 33. Current flowing through operating coil 6 energizes relay 11, closing contacts 19 and causing contact arm 52 to engage contact 56. Current flowing through operating coil 8 of relay 13 closes contacts 21 and causes contact arms 66, 67, 68 and 69 to engage contacts 75, 76, 77 and 78, respectively. Current flowing through operating coil 10 energizes relay 15 and causes contact arm 90 to engage contact 93. The flow of current through coil 31 energizes relay 30, causing armature 34 to engage contact 35 and also causing armature 37 to engage contact 38. Engagement of contact 35 by armature 34 causes the relay 42 to be energized to engage armature 46 with contact 47 and to engage armature 48 with contact 49.

Under the circuit conditions outlined above, the first phase of the "Y" signal will be transmitted as the individual frequency of the oscillator 110. The circuit for transmission of the first signal phase can be traced as follows: From the input terminal 116 of the audio-amplifier 114 to the contact 49, the armature 48, the armature 37, the contact 38, contact arm 90, contact 93, contact arm 82, contact 85, oscillator 110, and common return line 113 to the terminal 117 of the audio-amplifier 114.

During this first phase of the signal, the oscillator 110 is the only oscillator which is connected to the audio-amplifier 114. None of the oscillators 101 to 108 are connected to the audio-amplifier because of the fact that the contact 39 is not in engagement with the armature 37. The oscillators 109, 111 and 112 are not connected with the audio-amplifier because of the positions of the contact arms 82, 83 and 90.

The "Y" key is then released and the contacts 1, 3 and 5 are broken. Relays 15 and 30 are immediately deenergized, but the capacitors 22 and 24 prevent relays 11 and 13 from being deenergized for a brief interval which is sufficiently long to permit armature 34 to engage contact 36. Contacts 19 and 21 will be held closed during this brief time interval by virtue of the fact that the relays 11 and 13 remain energized. The capacitor 44 will prevent the relay 42 from being immediately deenergized. Current can then flow from the positive voltage source 40 through the armature 34, contact 36, armature 46 and contact 47 to the closed contacts 19 and 21 and through the locking coils 16 and 18 to the source of negative voltage 118. The relays 11 and 13 will thus be locked in energized positions. The circuit is then in condition for transmission of the second phase of the signal.

The second phase of the signal consists of the individual frequency of the oscillator 103. The circuit during the second phase of the signal may be traced from the input terminal 116 of the audio-amplifier 114 through the contact 49, armature 48, armature 37, contact 39, contact arm 52, contact 56, contact arm 58, contact 61, contact arm 67, contact 76, oscillator 103 and return line 113 to the terminal 117 of the audio-amplifier 114. The oscillator 103 is the only oscillator which is connected to the audio-amplifier 114 during the second phase of the signal. The second phase of the signal will persist until the energy stored in the capacitor 44 is dissipated, permitting relay 42 to be deenergized to separate armature 44 from contact 49, or until the first phase of a new signal begins through depression of another key of the keyboard.

It will be understod that the frequency of oscillator 110 represents the code element corresponding to contacts 5 and that the frequency of oscillator 103 is representative of the combination of code elements corresponding to contacts 1 and 3.

For purposes of further illustration let it be assumed that it is desired to transmit the letter "H." The depression of the "H" key will cause contacts 1 and 3 to be closed. The first phase of the signal would normally consist of the frequency of the oscillator 112 and the second phase of the signal would consist of the frequency of the oscillator 103. However, a frequency designated as zero can be used in either phase of the signal and oscillator 112 could be eliminated, in which case the first phase of the "H" signal would consist of the zero designated frequency. If the oscillator 112 is retained as the frequency designated as zero, oscillator 108 could be eliminated or vice versa.

It will now be clear that by the various combinations of the five elements of the teleprinter code the 31 characters of that code can be transmitted as alternate tone signals. The first phase or tone of the signal represents a combination of code elements corresponding to contacts 4 and 5 and the second tone or signal phase represents a combination of code elements corresponding to contacts 1, 2 and 3. While I have illustrated the five-unit code as having been arbitrarily separated into a first component consisting of code units corresponding to contacts 4 and 5 and a second component consisting of code units corresponding to contacts 1, 2 and 3, I contemplate that the separation may be made in other ways. For example, the first component might consist of a single code unit and the second component would then consist of four code units. The illustrated embodiment is, however, preferred since this arrangement permits use of the smallest number of individual oscillators or other frequency-determining means.

Each of the oscillators 101 to 111 (and oscillator 112, if present) have their own individual frequency, and each frequency is different from every other frequency. The first phase of the signal is a single frequency which is different from any other frequency transmitted by the apparatus. Similarly, the second phase of the signal is a single frequency which is different from any other frequency which is transmitted. The use of single frequencies in this manner eliminates the sending of complex tones and reduces the likelihood of errors or losses in transmission. The receiver will of course be capable of distinguishing between the frequencies which are used in the first phase of the signal and those which are used in the second phase, and there is no need for synchronism of the receiver with the transmitter. The first phase of the signal may be allowed to persist as long as a key is kept depressed. The second phase of the signal will persist until another key has been depressed or until the energy in the capacitor 44 of the relay 42 has been dissipated. Any convenient time interval may be permitted to elapse between the second phase of one signal and the first phase of the next subsequent signal. This arrangement permits transmission at any desired speed and the speed of transmission need not be constant.

*Description of the receiver for tape printing*

Figure 2:
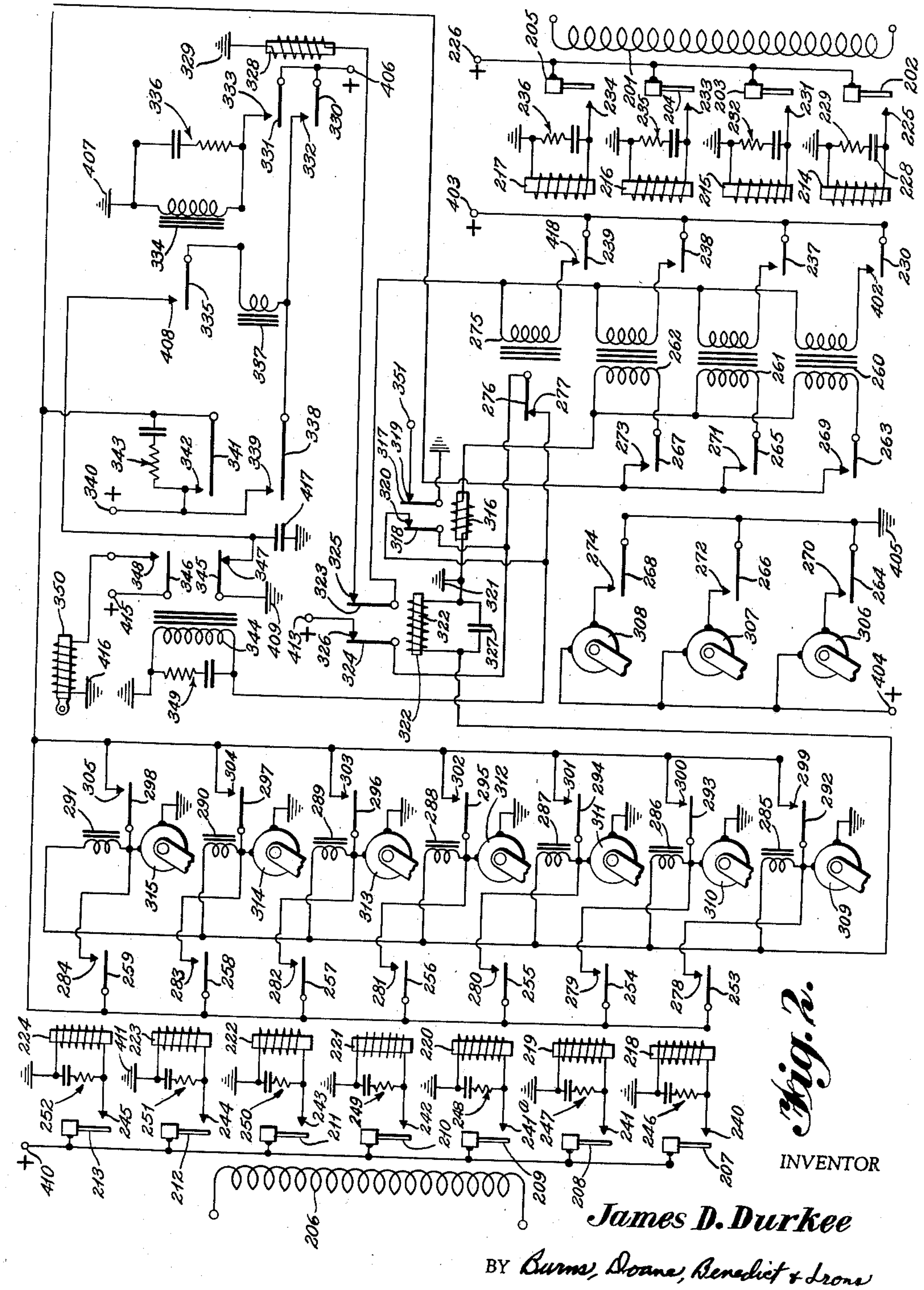
Figure 2 is a wiring diagram of a receiver intended for use with a tape printer.

The wiring diagram shown in Figure 2 illustrates apparatus intended for use with a tape printer such as that described and claimed in my co-pending application, Serial No. 309,033, filed September 11, 1952, now Patent No. 2,742,532. The tape printer of that application includes an angularly and rectilinearly movable type font. The type font is movable relative to a striker arm which operates to force the tape and an inking ribbon against a character on the type font. The angular and rectilinear orientation of the type font to bring the desired character to the tape and striker arm is controlled by ten solenoids, three of which control the angular position of the type font, and seven of which control the rectilinear position of the type font. The type font has neutral angular and rectilinear positions which it occupies when the corresponding solenoids are not actuated.

All of the relay contacts shown in Figure 2 are illustrated in the positions which they occupy when the relays are not energized with the exception of the relay 344 which is shown in the energized position.

Reference numeral 201 designates the driving coil of a multi-reed relay of the type described and claimed in my co-pending application, Serial No. 283,626, filed April 22, 1952, now Patent No. 2,691,749. Selectively tuned reeds 202, 203, 204, 205 are individually vibratable by different frequencies in the driving coil 201. Reference numeral 206 designates the driving coil of a similar multi-reed relay having selectively tuned reeds 207, 208, 209, 210, 211, 212 and 213. Each of the reeds 207 to 213 will be caused to vibrate when current of a frequency corresponding to its resonant frequency flows through the driving coil 206. The driving coils 201 and 206 are connected to the audio output of a radio receiver or to a line amplifier adjusted to respond to the signals transmitted by the transmitter illustrated in Figure 1.

Reference numerals 214, 215, 216 and 217 represent sensitive relays associated with the reeds 202, 203, 204, 205 respectively. The reference numerals 218, 219, 220, 221, 222, 223 and 224 designate sensitive relays associated with reeds 207 to 213 respectively. A contact 225 is positioned in the path of vibration of the reed 202 from which this contact receives positive current from a positive current source 226 when the reed 202 is vibrating. Current will thus be caused to flow through the coil of relay 214 to ground 227. A condenser 228 and a current-limiting resistor 229 shunt the coil of relay 214 to prevent deenergization of that relay during those phases of the vibration of the reed 202 when it is not in contact with contact 225. The relay 214 controls the position of an armature 230. A contact 231 and a condenser-resistor combination 232 are similarly associated with the reed 203 and the winding of relay 215. Contacts 233 and 234 and condenser-resistor combinations 235 and 236 are similarly associated with the reeds 204 and 205 and the windings of relays 216 and 217 respectively. The relay 215 controls the position of an armature 237, relay 216 controls an armature 238, and relay 217 controls an armature 239.

Contacts 240, 241, 241*a*, 242, 243, 244 and 245 are associated with reeds 207 to 213 respectively. Condenser-resistor combinations 246, 247, 248, 249, 250, 251 and 252 are connected in shunt with the windings of relays 218 to 224 respectively for the purpose described above. The windings of relays 218 to 224 control the positions of armatures 253, 254, 255, 256, 257, 258 and 259 respectively.

Reference numerals 260, 261 and 262 designate double coil relays. The relay 260 controls armatures 263 and 264, relay 261 controls armatures 265 and 266, and relay 262 controls armatures 267 and 268. Armature 263 is arranged to close a contact 269 and armature 264 closes a contact 270. Armature 265 closes a contact 271 and armature 266 closes a contact 272. Armature 267 is arranged to close a contact 273 and armature 268 is arranged to close a contact 274. The reference numeral 275 designates a single coil relay arranged to control an armature 276 having a contact 277.

Contacts 278, 279, 280, 281, 282, 283 and 284 are positioned to be closed by the armatures 253 to 259 respectively to control the energization of relays 285, 286, 287, 288, 289, 290 and 291 respectively. Relays 285 to 291 control armatures 292, 293, 294, 295, 296, 297 and 298 respectively. These armatures are provided with contacts 299, 300, 301, 302, 303, 304 and 305.

Reference numerals 306, 307, 308 designate rotary solenoids which are used to control the angular orientation of the type font. The rotary solenoids which are used to control the rectilinear orientation of the type font are designated by the reference numerals 309, 310, 311, 312, 313, 314 and 315.

Reference numeral 316 designates a relay which is provided with armatures 317 and 318 having contacts 319 and 320 respectively. The winding of relay 316 is connected in series between the locking coils of relays 260, 261 and 262 and the negative or ground connection 321. Reference numeral 322 designates a relay which controls armatures 323 and 324, which are arranged to engage normally closed contacts 325 and 326 respectively. A condenser 327 is connected in shunt with the winding of relay 322. The winding of relay 322 is connected in series between the windings of relays 285 to 291 inclusive and the negative or ground connection 321. The purpose of the capacitor 327 is to cause a temporary surge through any one of the windings of relays 285 to 291 when any one of such windings is energized.

The reference numeral 328 designates a relay having a winding connected in series between the operating coils of relays 260, 261, 262 and 275 and the negative or ground terminal 329. Current will thus flow through the winding of relay 328 when any one of the relays 260, 261, 262 and 275 are energized. The relay 328 controls armatures 330 and 331 which are provided with contacts 332 and 333 respectively. The reference numeral 334 designates a relay which controls an armature 335. A combination condenser-resistor 336 controls the release time of the armature 335. Reference numeral 337 designates a self-locking relay, the locking of which is performed by engagement of the armature 338 with a contact 339 connected to a positive current source 340. The relay 337 also controls an armature 341 arranged to engage a contact 342 to control the enegization of the type font positioning solenoids and the energization of the locking coils of the relays 260, 261 and 262. The contact 342 is prevented from arcing by the resistor-capacitor combination designated by the reference numeral 343.

A printing control relay 344 controls armatures 345 and 346 having contacts 347 and 348 respectively. A resistor-capacitor combination 349 controls the release time of the relay 344. The reference numeral 350 designates the printer actuating solenoid which causes the striker arm to press the tape and inked ribbon against the oriented type font. The reference numeral 351 designates the terminal or connection of the spacing solenoid.

*Apparatus for orientation of the type font and for printing*

Figure 3:
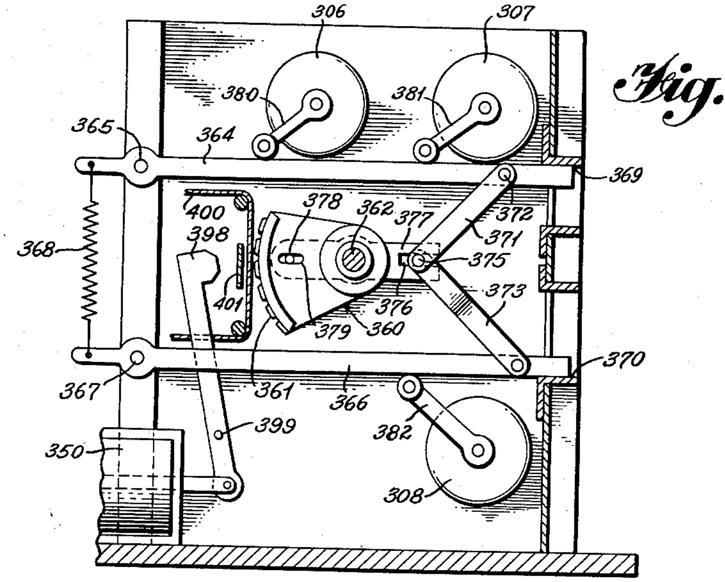
Figure 3 is a view partly in side elevation and partly in cross-section of a type font and mechanism for angular orientation thereof.
Figure 4:
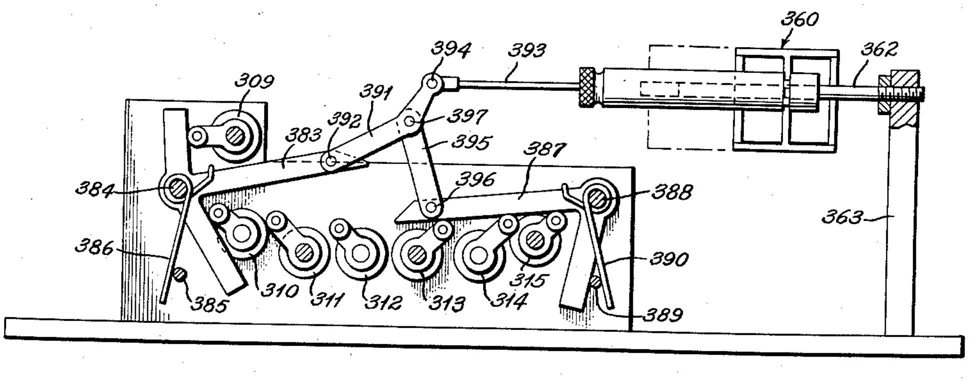
Figure 4 is a similar view of mechanism for securing rectilinear orientation of the type font.

The apparatus for orienting the type font and for printing is illustrated in Figures 3 and 4 and embodies mechanical linkages described and claimed in my copending application, Serial No. 301,402, filed July 28, 1952, now Patent No. 2,680,970. The type font designated generally by the reference numeral 360 is provided with an arcuate face 361 having printing characters longitudinally and vertically spaced thereon. The type font 360 is longitudinally and angularly movable on a horizontal rod 362 which is shown as rigidly supported by a standard 363. Angular orientation of the type font is controlled by the apparatus illustrated in Figure 3, while the longitudinal or rectilinear orientation of the type font is accomplished by the apparatus illustrated in Figure 4.

Referring particularly to Figure 3, a lever 364 is mounted on a fixed pivot 365 and a lever 366 is mounted on a fixed pivot 367. A tension spring member 368 urges the free end of the lever 364 against a stop member 369 and also urges the free end of the lever 366 against a stop member 370. A link 371 is pivotally connected to the lever 364 at 372 and a link 373 is pivotally connected to the lever 366. The links 371 and 373 are connected by a pivot pin 375 which is slidable in a slot 376 in an arm 377 which arm is capable of imparting angular movement to the type font 360 by means of a pin 378 carried by the arm 377 and a slot 379 in the type font. This pin 378 and slot 379 do not prevent longitudinal movement of the type font. The rotary solenoids 306, 307 and 308 described above are designated by similar reference numerals in Figure 3, these solenoids being shown in their deenergized positions.

It will be apparent from inspection of Figure 3 that energization of rotary solenoid 306 will cause its movable arm 380 to depress the lever 364 and to cause clockwise movement of the type font 360. Energization of the solenoid 307 will cause its movable arm 381 to depress the lever 364 by a lesser amount and will consequently cause lesser clockwise movement of the type font. Energization of the solenoid 308 will cause its movable arm 382 to raise the lever 366 and to cause counterclockwise movement of the type font 360. When none of the solenoids 306, 307 or 308 are energized the type font will occupy a neutral angular position. There are thus four available angular positions of the type font and the type font carries four horizontal rows of characters on its face 361.

The arrangement for accomplishing rectilinear or longitudinal orientation of the type font is illustrated in Figure 4. A T-shaped lever 383 is mounted on a fixed pivot 384 and is urged toward a fixed stop member 385 by means of a torsion spring member 386. A generally L-shaped lever 387 is mounted on a fixed pivot 388 and is urged toward engagement with a stop member 389 by means of a torsion spring member 390. A link 391 has one of its ends pivotally connected to the lever 383 at 392. The opposite end of link 391 is pivotally connected to a type font actuating rod 393 at 394. A link 395 is pivotally connected to the lever 387 at 396. The opposite end of the link 395 is pivotally connected to an intermediate portion of the link 391 at 397.

The rotary solenoids 309 to 315 described above are designated by similar reference numerals in Figure 4. The solenoid 309 is shown in its energized position in which it has engaged one leg of the lever 383 and has caused rightward movement of the type font 360 from the neutral horizontal position which it occupies when none of the solenoids 309 to 315 is energized. The rightward movement of the type font from its neutral horizontal position is accomplished by means of the solenoids 309, 310, 311 and 312 and the extent of such rightward movement is controlled by the distance which the energized one of these solenoids is located from the fixed pivot 384. Leftward movement of the type font from its neutral horizontal position is accomplished by means of the solenoids 313, 314 and 315 and the extent of such leftward movement is controlled by the distance which the energized one of these solenoids is spaced from the fixed pivot 388. It will thus be seen that the type font 360 has four horizontal positions to the right of its neutral horizontal position and three horizontal positions to the left of the neutral horizontal position. There are thus eight horizontal positions of the type font and there are eight vertical rows of characters on the face 361 of the type font.

By energization of the proper solenoid or solenoids, the desired character on the face 361 of the type font can be positioned in the path of movement of the striker arm 398 which is pivoted at 399 and which is actuated by the solenoid 350 described above. An inked ribbon 400 is positioned adjacent the face 361 of the type font and the tape 401 to be printed is positioned between the striker arm and the inked ribbon. It will be understood that the solenoid 350 is energized to print the desired character after the type font has been oriented.

*Operation of the receiver for tape printing*

For the purpose of describing the operation of the receiving system illustrated in Figures 2, 3 and 4 it will be assumed that a letter such as the letter "Y" has been transmitted by the transmitter shown in Figure 1. The signal representative of the letter "Y" will be received by a radio receiver if transmitted by radio or by a line amplifier if transmitted by wire. This signal will be presented as alternate audio tones to the driving coils 201 and 206. The first audio tone in the case of the letter "Y" will consist of the single frequency of the frequency-determining element 110 of the transmitter. It will be assumed that the reed 202 is resonant to this frequency and that this reed and this reed only will vibrate during the first phase of the signal. Vibration of the reed 202 will close contact 225 and will permit current to flow from positive current source 226 through the relay 214 to negative or ground terminal 227. Armature 230 will then engage contact 402 permitting current flow from positive current source 403 through the operating coil of relay 260, through armature 323, contact 325 and relay 328 to ground terminal 329. Flow of current through the operating coil of relay 260 causes armature 263 to engage contact 269 and also causes armature 264 to engage contact 270. The flow of current through relay 328 causes armature 330 to engage contact 332 and causes armature 331 to engage contact 333. Engagement of armature 264 with contact 270 provides a circuit for flow of current from positive current source 404 through the angular positioning solenoid 306, the contact 270 and armature 264 to negative or ground terminal 405. Energization of the solenoid 306 causes angular movement of the type font to place the horizontal row of characters containing the letter "Y" adjacent the striker bar 398.

The engagement of contact 333 by the armature 331 causes current to flow from positive current source 406 through the winding 334 to negative or ground terminal 407 thereby causing armature 335 to engage contact 408. Current then flows from positive current source 406 through armature 330, contact 332, relay 337, armature 335, contact 408, contact 347 and armature 345 to negative or ground terminal 409. The flow of current through relay 337 causes armature 338 to engage contact 339 and also causes armature 341 to engage contact 342. Engagement of contact 339 by armature 338 completes the circuit from positive current source 340 through relay 337, armature 335, contact 408, contact 347 and armature 345 to ground connection 409 thereby locking armature 338 in engagement with contact 339 and locking armature 341 in engagement with contact 342. Current can then flow from positive current source 340 through contact 342, armature 341, contact 269, armature 263, locking coil of relay 260, and relay 316 to ground terminal 321. This flow of current through relay 316 causes armature 317 to disengage contact 319 and also causes armature 318 to disengage contact 320. The disengagement of armature 317 and contact 319 prevents the possibility of the spacing solenoid connected to terminal 351 being operated under the conditions being described. Disengagement of armature 318 and contact 320 conditions the apparatus for the subsequent operations herein described.

The circuit arrangement described above persists while the first phase of the signal is being received and reed 202 is vibrating. When the first phase of the signal ceases, reed 202 will stop vibrating and will no longer make engagement with contact 225. Current will cease flowing through relay 214 and armature 230 will disengage contact 402 which will in turn cause current to cease flowing through relay 328, thereby disengaging armature 330 from contact 332 and disengaging armature 331 from contact 333. However, current will continue to flow through relay 337 so long as the condenser-resistor combination 336 associated with the relay 334 prevents armature 335 from disengaging contact 408. The value of the condenser-resistor combination 336 is sufficient to keep armature 335 in engagement with contact 408 long enough to complete a cycle of operation.

So long as the armature 341 is in engagement with contact 342 the system is in condition to receive the second phase of the signal, since a positive source of current is supplied from positive current source 340 through contact 342 and armature 341 to the armatures 253 to 259 inclusive. The second tone or second phase of the "Y" signal will consist of the single frequency determined by the frequency-determining element 103 of Figure 1 and will be assumed to cause reed 212 to vibrate. The vibration of reed 212 will cause engagement of that reed with contact 244 thereby causing flow of current from positive current source 410 through relay 223 to ground terminal 411. The flow of current through relay 223 causes armature 258 to engage contact 283, thereby causing current to flow through relay 290 and relay 322 to ground terminal 321. The flow of current through relay 290 causes armature 297 to engage contact 304 and the flow of current through relay 322 causes armature 323 to disengage contact 325 and also causes armature 324 to disengage contact 326. The engagement of armature 258 and contact 283 also provides a source of positive current for the horizontal type font positioning solenoid 314 which is connected to ground terminal 412. Energization of the solenoid 314 causes the type font to be moved longitudinally to the position in which the character "Y" is adjacent the striker arm 398.

Engagement of armature 297 with contact 304 also provides a source of positive current to lock the relay 290 and the relay 322 in energized condition. This condition persists as long as armature 341 is in engagement with contact 342.

Disengagement of armature 323 and contact 325 removes the possibility of relays 260, 261, 262 and 275 being again energized before the character printing operation is completed. Disengagement of armature 324 and contact 326 causes current to cease flowing from positive terminal 413 through relay 344 to negative terminal 414. The cessation of flow of current through relay 344 causes armature 345 to disengage contact 347 and causes armature 346 to engage contact 348 but these actions do not occur immediately because of the presence of the condenser-resistor combination 349. The condenser of the condenser-resistor combination 349 will maintain current in relay 344 long enough to permit the horizontal positioning solenoid 314 to move the type font into printing position. Thereupon the engagement of armature 346 and contact 348 will cause current to flow from positive current source 415 through printer actuating solenoid 350 to negative terminal 416. The character "Y" will thus be printed on the tape.

Disengagement of armature 345 and contact 347 occurs simultaneously with the printing operation and removes the negative terminal 409 from the circuit supplying the relay 337, thereby disengaging armature 338 from contact 339 and also disengaging armature 341 from contact 342. The disengagement of armature 338 from contact 339 removes the source of locking current from relay 337. Disengagement of armature 341 and contact 342 removes the source of positive current supplying the relay 290, the relay 322, the relay 316 and the locking coil of the relay 260, thereby placing the system in condition to receive the first phase of a new signal. In the event the second phase of the signal persists beyond the period of time required to complete the printing operation the system is not affected, since the source of current necessary to energize relays 285 to 291 inclusive is removed when armature 341 disengages contact 342.

The purpose of condenser 417 is to cause current to continue to flow through relay 337 for a short interval of time after armature 345 has disengaged contact 347 to permit the printer striker arm to complete its stroke before the type font orienting solenoids begin to return to their normal deenergized positions.

Had the first phase of the signal consisted of a character which did not cause vibration of any of the reeds 202 to 204, the audio tone of the first phase would be resonant with the reed 205 in which case the function of the first phase of the signal would be to condition the apparatus to be operative upon receipt of the second phase of the signal. This is accomplished by the engagement of armature 239 with contact 418 which causes current to flow through relay 275 and relay 328. In the event the second phase of the signal is of a frequency which does not cause any of the reeds 207 to 213 to vibrate, the audio tone of the second phase will again be resonant with reed 205 and armature 239 would engage contact 418. However, in this instance the first phase of the signal would have been of a frequency to cause one of the reeds 202, 203 or 204 to vibrate and this first phase of the signal would have caused continued flow of current through relay 316, and armature 318 would be out of engagement with contact 320 when the second phase of the signal was received. Therefore, when relay 275 was energized by engagement of armature 239 with contact 418, the circuit from positive terminal 413 would be broken at the armature 318 and would also be broken at the contact 277 and the source of current supplying relay 344 would thereby be removed with the result that the printing operation would be performed.

*Description of the receiver for use as a tape reperforator or for use with a conventional sequential tone type teleprinter*

The receiver illustrated in Figure 2 may be modified for use in connection with conventional sequential tone type teleprinting equipment. As so modified the receiver can also be used in connection with a tape reperforator of conventional design. To accomplish theses objectves it is necessary to convert the two tones or phases of the signal back into the conventional five-unit code from which the signal originated.

Figure 5:
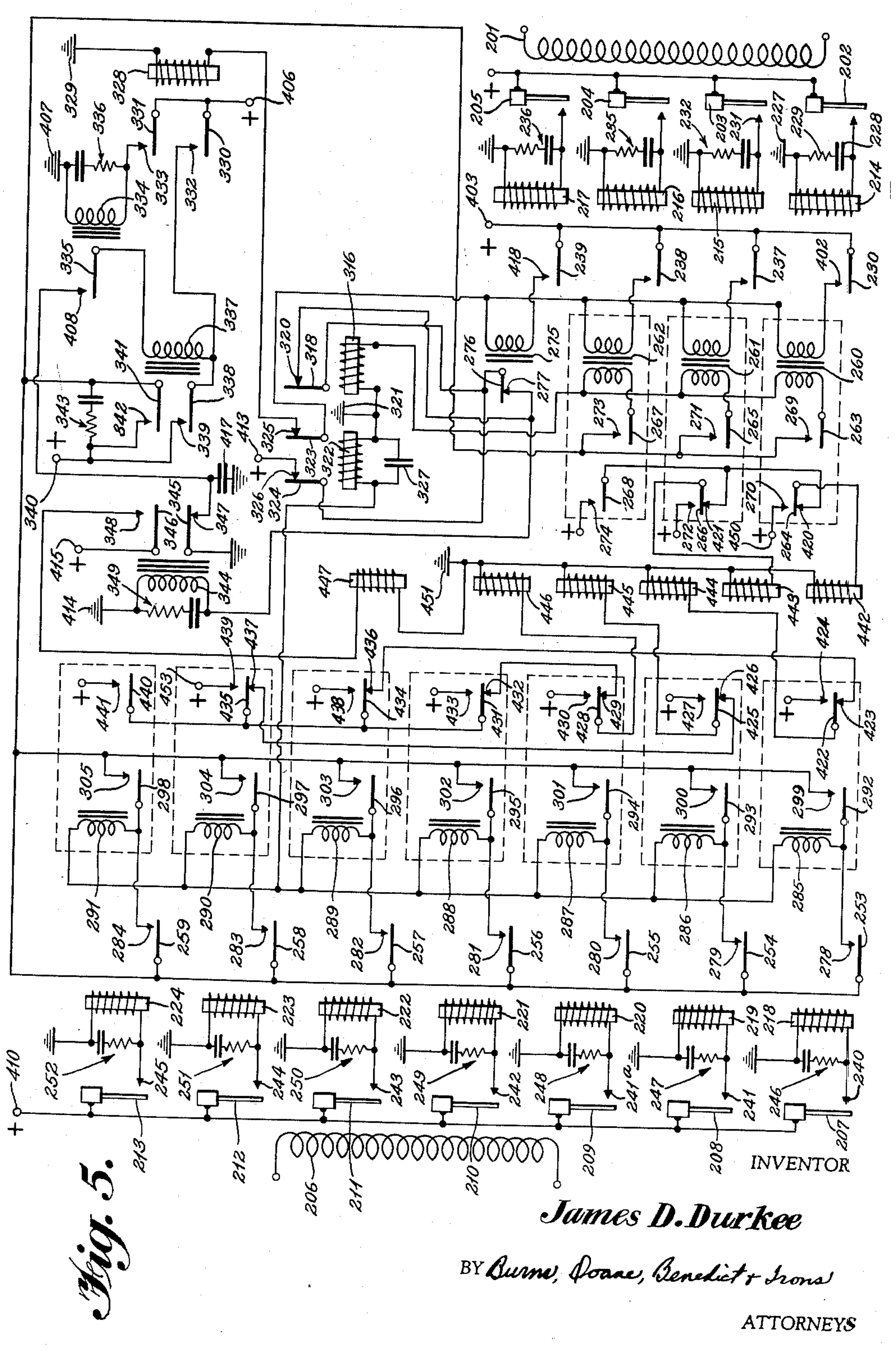
Figure 5 is a wiring diagram of a receiver intended for use with a tape perforator or for use with a conventional teleprinter of the five-unit sequential tone type.

Figure 5 represents diagrammatically the receiver as modified for use with a tape reperforator. However, the punch selecting solenoids of the reperforator may be considered as the equivalents of the selector bars of a conventional teleprinter and the tape perforating solenoid may be considered as the equivalent of the printing actuator of a conventional teleprinter. For purposes of illustration the receiver illustrated in Figure 5 will be described for use in connection with a tape reperforator.

Except for the modifications hereinafter described the receiver shown in Figure 5 is the same as that illustrated in Figure 2. For that reason the same reference numerals are applied to the corresponding elements.

Contact 420 has been added and normally engages the armature 264 of the relay 260. A similar contact 421 has been added which normally engages the armature 266 of the relay 261. Single-pole double-throw switches have been added to be actuated by the relays 285 to 290 inclusive. The armature of the switch actuated by relay 285 is designated by the reference numeral 422 and is provided with a normally closed contact 423 and a normally open contact 424. The armature of the switch actuated by relay 286 is designated by the reference numeral 425 and is provided with a normally closed contact 426 and a normally open contact 427. Arranged to be actuated by the relay 287 is an armature 428 having associated therewith a normally closed contact 429 and a normally open contact 430. The armature 431 which is actuated by relay 288 is provided with a normally closed contact 432 and a normally open contact 433. Similarly the armatures 434 and 435 are provided with normally closed contacts 436 and 437 respectively and normally open contacts 438 and 439 respectively. The armature 440 which is actuated by the relay 291 is provided with a single normally open contact 441.

The electrical connections of the added contacts and switches are arranged so that relay 260 controls energization of punch selecting solenoid 442 which may select punches representing code element 5 of the conventional teleprinter code. Relay 261 controls energization of punch selecting solenoid 443 which may select punches representing the conventional teleprinter code element 4. Relay 262 controls energization of both punch selecting solenoids 442 and 443. Relay 285 controls energization of punch selecting solenoid 444 which may select punches representing the conventional teleprinter code element 1. Relay 286 controls energization of punch selecting solenoid 445 which may select punches representing the conventional teleprinter code element 2. Relay 287 controls energization of punch selecting solenoid 446 which may select punches representing the conventional teleprinter code element 3. Relay 288 controls simultaneous energization of punch selecting solenoids 444 and 445. Relay 289 controls simultaneous energization of punch selecting solenoids 445 and 446. Relay 290 controls simultaneous energization of punch selecting solenoids 444 and 446 and relay 291 controls simultaneous energization of punch selecting solenoids 444, 445 and 446.

The printer actuating solenoid 350 of Figure 2 has been replaced by a punch actuating solenoid 447 which is connected in series between the contact 348 and the punch selecting solenoid 446. The punch actuating solenoid 447 performs the function of perforating the tape after the proper punch selections have been made in much the same manner that the printer actuating solenoid 350 actuates the printer bar in the arrangement of Figure 2.

The armature 317 and the contact 319, associated with relay 316, in Figure 2 perform no function in the modification of Figure 5 and they have been eliminated in this modification.

*Operation of the receiver as a tape reperforator*

With the exception of the modifications described above the operation of the receiver of Figure 5 is essentially the same as the operation described in connection with Figure 2. Let it again be assumed that a signal representing the letter "Y" which consists of code elements 1, 3 and 5 of the conventional teleprinter code has been transmitted. The first phase of the signal will cause the same action as described above in connection with Figure 2. The engagement of armature 264 with contact 270 will cause current to flow from positive terminal 450 through punch selecting solenoid 442 to negative or ground terminal 451. Energization of punch selecting solenoid 442 causes the selection of punches representative of code element 5 of the conventional teleprinter code. These punches are locked in selected position to perforate the tape in a manner representative of this code element when the punch actuated solenoid 447 is energized. The second phase of the signal will cause current to flow through relay 290 and cause armature 435 to engage contact 439. Current will then flow from positive terminal 453 through contact 439, armature 435, armature 434, contact 436, contact 423 and armature 422 to punch selecting solenoid 444. At the same time current will flow from the positive terminal 453 through the contact 439, armature 435, armature 431, contact 432, contact 429 and armature 428 to punch selecting solenoid 446. It will be remembered that punch selecting solenoids 444 and 446 select punches which are representative of code elements 1 and 3 of the conventional teleprinter code. Those punches are located in positions to properly perforate the tape when punch actuating solenoid 447 is energized.

In the manner previously described in the description of Figure 2 when current flowed through relay 290 action was initiated to cause current to cease flowing through relay 344, resulting in engagement of armature 346 with contact 348 and disengagement of armature 345 and contact 347. When armature 346 engages contact 348 the circuit is completed from positive terminal 340 through armature 346, contact 348 and punch actuating solenoid 447 to negative terminal 451. The punch actuating solenoid 447 is thus energized and the tape is perforated with the previously selected punches.

When armature 345 disengages contact 347 the previously described system clearing action is initiated and the apparatus is prepared for the reception of a subsequent signal.

The tape perforated in this manner can be used to store the signals constituting a message or the tape can be used for re-transmission of a message on or to conventional sequential tone teleprinter equipment.

I have illustrated and described what I now consider to be the preferred embodiments of my invention. It will be understood, however, that various modifications may be used without departing from the broad scope of the invention which is defined by the following claims.

I claim:

1. Apparatus for reception of an intelligible alphabetical signal transmitted as individual first and second tones constituting first and second signal phases, said apparatus comprising an angularly and rectilinearly movable type font, printer-actuating mechanism cooperating with said type font to record selected characters from said font, a first tuned reed vibrating in response to the tone of one of said signal phases, first relay means responsive to vibration of said first tuned reed, a first solenoid controlled by said first relay means to impart an angular orienting movement to said type font, a second tuned reed vibrating in response to the tone of the other of said signal phases, second relay means responsive to vibration of said second tuned reed, a second solenoid controlled by said second relay means to impart a rectilinear orienting movement to said type font, means associated with the relay means responsive to the first signal phase for locking such relay means to hold the solenoid controlled thereby in actuated condition during the second signal phase, and means connected to actuate said printer-actuating mechanism responsive to said second signal phase.

2. Apparatus for reception of an intelligible alphabetical signal transmitted as individual first and second tones constituting first and second signal phases, said apparatus comprising an angularly and rectilinearly movable type font, printer-actuating mechanism cooperating with said type font to record selected characters from said font, a first tuned reed vibrating in response to the tone of said first signal phase, first relay means responsive to vibration of said first tuned reed, a first solenoid controlled by said first relay means to impart an angular orienting movement to said type font, a second tuned reed vibrating in response to the tone of said second signal phase, second relay means responsive to vibration of said second tuned reed, a second solenoid controlled by said second relay means to impart a rectilinear orienting movement to said type font, means associated with said first relay means for locking such relay means to hold said first solenoid in actuated condition during said second signal phase, and means connected to actuate said printer-actuating mechanism responsive to said second signal phase.

3. Apparatus for receiving and recording on perforated tape an alphabetical signal transmitted as individual first and second tones constituting first and second signal phases, said apparatus comprising a plurality of punch selecting solenoids, a tape perforating solenoid, a first tuned reed vibrating in response to the tone of said first signal phase, first relay means responsive to vibration of said first tuned reed and controlling actuation of certain of said punch selecting solenoids, a second tuned reed vibrating in response to the tone of said second signal phase, second relay means responsive to vibration of said second tuned reed and controlling actuation of certain other of said punch selecting solenoids, means for locking said first relay means to hold the punch selecting solenoids controlled thereby in actuated condition during said second signal phase, and means responsive to said second signal phase to actuate said tape perforating solenoid to perforate a tape with the punches selected by said punch selecting solenoids.

4. Apparatus for receiving and recording an alphabetical signal transmitted as individual first and second tones constituting first and second signal phases, said apparatus comprising a plurality of punch selecting solenoids, a tape perforating solenoid, a first tuned reed vibrating in response to the tone of the first signal phase, means responsive to vibration of said first tuned reed to actuate certain of said punch selecting solenoids, a second tuned reed vibrating in response to the tone of the second signal phase, and means responsive to vibration of said second tuned reed to actuate certain other of said punch selecting solenoids and to also actuate said tape perforating solenoid to perforate a paper tape with the selected punches.

5. Apparatus for receiving and printing an intelligible alphabetical signal transmitted as individual first and second tones constituting first and second signal phases, said apparatus comprising a movable type font, printer-actuating mechanism cooperating with said type font to record selected characters from said font, a first tuned reed vibrating in response to the tone of said first signal phase, first relay means responsive to vibration of said first tuned reed, a first solenoid controlled by said first relay means to impart an initial orienting movement to said type font, a second tuned reed vibrating in response to the tone of said second signal phase, second relay means responsive to vibration of said second tuned reed, a second solenoid controlled by said second relay means to impart a final orienting movement to said type font, means associated with said first relay means to hold said first solenoid in actuated condition during said second signal phase, and means connected to actuate said printer-actuating mechanism responsive to said second signal phase to print an alphabetical character determined by the oriented position of said type font.

6. A method of transmitting and receiving intelligible alphabetical signals which comprises representing the alphabet as a five-unit code, separating such five-unit code into a first component of at least two code units and a second component of the remaining code units, expanding the first component by binary progression into a first group of parts, expanding the second component by binary progression into a second group of parts, assigning individual identities to each part of each group, alternately transmitting a single part from the first group and a single part from the second group to transmit an alphabetical signal, converting the part from the first group at a receiver into its corresponding units of the said five-unit code, converting the part from the second group into its corresponding units of the said five-unit code, and recording the said units of the five-unit code at the receiver.

7. A method of transmitting and receiving intelligible alphabetical signals which comprises representing the alphabet as a five-unit code, separating such five-unit code into a first component of at least two code units and a second component of the remaining code units, expanding the first component by binary progression into a first group of parts, expanding the second component by binary progression into a second group of parts, assigning individual identities to each part of each group, alternately transmitting a single part from the first group as a first signal phase and a single part from the second group as a second signal phase to transmit an alphabetical signal, utilizing the first signal phase at a receiver to perform one of a plurality of operations necessary to the recording of the alphabetical signal transmitted, and utilizing the second signal phase to complete the operations necessary to the recording of the alphabetical signal transmitted.

8. A method of transmitting and receiving intelligible alphabetical signals which comprises representing the alphabet as a five-unit code, separating such five-unit code into two components of two and three units respectively, expanding the two-unit component by binary progression into a group of four parts, expanding the three-unit component by binary progression into a group of eight parts, assigning individual identities to each part of each group, alternately transmitting a single part from the four-part group and a single part from the eight-part group to transmit an alphabetical signal, converting the part from the four-part group at a receiver into its corresponding units of the said five-unit code, converting the part from the eight-part group into its corresponding units of the said five-unit code, and recording the said units of the five-unit code at the receiver.

9. A method of transmitting and receiving intelligible alphabetical signals which comprises representing the alphabet as a five-unit code, separating such five-unit code into two components of two and three units respectively, expanding the two-unit component by binary progression into a group of four parts, expanding the three-unit component by binary progression into a group of eight parts, assigning individual identities to each part of each group, transmitting a single part from the four-part group as a first signal phase and a single part from the eight-part group as a second signal phase to transmit an alphabetical signal, utilizing the first signal phase at a receiver to perform one of a plurality of operations necessary to the recording of the alphabetical signal transmitted, and utilizing the second signal phase to complete the operations necessary to the recording of the alphabetical signal transmitted.

10. A telegraph printer for reception of an alphabetical signal transmitted as individual first and second tones constituting first and second signal phases, said apparatus comprising angularly and rectilinearly movable type font having a neutral position, a first mechanism for imparting angular movement to said type font, a second mechanism for imparting rectilinear movement to said type font, each of said mechanisms comprising a pair of levers which are independently oscillatable about fixed axes, means for biasing said levers toward definite normal positions of said levers, a pair of links pivotally connected to said levers at points spaced from the fixed axes thereof, said links being pivotally connected together by a pivot pin which occupies a definite neutral position when both said arms are in their normal positions, means connecting said pivot pin of said first mechanism to said type font to impart angular movement to said type font from its neutral position upon movement of such pivot pin from its neutral position, means connecting said pivot pin of said second mechanism to said type font to impart rectilinear movement to the type font from its neutral position upon movement of the said pivot pin of the second mechanism from its neutral position, a first group of solenoids positioned adjacent the levers of said first mechanism at different distances from the axes thereof, first relay means responsive to one of said signal phases for selectively energizing one only of said first group of solenoids to move said type font angularly in one direction or the other from its neutral position by an amount dependent on the one of said solenoids of said first group which is energized, a second group of solenoids positioned adjacent the levers of said second mechanism at different distances from the axes thereof, second relay means responsive to the other of said signal phases for selectively energizing one only of the solenoids of said second group to move said type font rectilinearly in one direction or the other from its neutral position by an amount dependent on the one of said solenoids of said second group which is energized, and means for printing an alphabetical character corresponding to the angular and rectilinear orientation of said type font.

11. A telegraph printer for reception of an alphabetical signal transmitted as individual first and second tones constituting first and second signal phases, said apparatus comprising a type font having a neutral position and being movable angularly and rectilinearly from such neutral position, a first mechanism for imparting angular movement to said type font, a second mechanism for imparting rectilinear movement to said type font, each of said mechanisms comprising a lever which is oscillatable about a fixed axis, means for biasing said lever toward a definite normal position, means connecting said lever of said first mechanism to said type font to impart angular movement to said type font from its neutral position upon movement of such lever from its normal position, means connecting said lever of said second mechanism to said type font to impart rectilinear movement to the type font from its neutral position upon movement of the said lever of the second mechanism from its normal position, a first group of solenoids positioned adjacent the lever of said first mechanism at different distances from the axis thereof, first relay means responsive to one of said signal phases for selectively energizing one only of said first group of solenoids to move said type font angularly from its neutral position by an amount dependent on the one of said solenoids of said first group which is energized, a second group of solenoids positioned adjacent the lever of said second mechanism at different distances from the axis thereof, second relay means responsive to the other of said signal phases for selectively energizing one only of the solenoids of said second group to move said type font rectilinearly from its neutral position by an amount dependent on the one of said solenoids of said second group which is energized, and means for printing an alphabetical character corresponding to the angular and rectilinear orientation of said type font.

12. Apparatus for reception and recordation of an intelligible functional signal transmitted as individual first and second tones constituting first and second signal phases, said apparatus comprising a first group of tuned frequency sensitive means each responsive to a different signal tone of said first signal phase and each having relay means operable in response to the receipt of the signal tone to which its frequency sensitive means is tuned, a second group of tuned frequency sensitive means each responsive to a different signal tone of said second signal phase and each having relay means operable in response to the receipt of the signal tone to which its frequency sensitive means is tuned, a signal recording mechanism including signal selecting means and means for recording the selected signal, said relay means being connected to operate said selecting means in accordance with the particular one of the relay means of said first group of frequency sensitive means and the particular one of the relay means of said second group of frequency sensitive means which is operated, and means interconnecting the relay means of said second group of tuned frequency sensitive means and the relay means of said first group of frequency sensitive means to render the relay means of said second group of frequency sensitive means ineffective to control operation of said selecting means in the absence of prior operation of one of the relay means of said first group of frequency sensitive means.

13. Apparatus for reception and recordation of an intelligible functional signal transmitted as individual first and second tones constituting first and second signal phases, said apparatus comprising a first group of tuned frequency sensitive means each responsive to a different signal tone of said first signal phase and each having relay means operable in response to the receipt of the signal tone to which its frequency sensitive means is tuned, a second group of tuned frequency sensitive means each responsive to a different signal tone of said second signal phase and each having relay means operable in response to the receipt of the signal tone to which its frequency sensitive means is tuned, a signal recording mechanism including signal selecting means and means for recording the selected signal, said relay means being connected to operate said selecting means in accordance with the particular one of the relay means of said first group of frequency sensitive means and the particular one of the relay means of said second group of frequency sensitive means which is operated, means interconnecting the relay means of said second group of tuned frequency sensitive means and the relay means of said first group of frequency sensitive means to render the relay means of said second group of frequency sensitive means ineffective to control operation of said selecting means in the absence of prior operation of one of the relay means of said first group of frequency sensitive means, holding means for the relay means of said first group of frequency sensitive means to retain the operated one of such relay means energized pending operation of one of the relay means of said second groups of frequency sensitive means in response to the second tone of a two phase signal, the relay means of said second group of frequency sensitive means being connected with the means for recording the signal of said signal recording mechanism so as to initiate actuation of the signal recording means upon operation of one of the relay means of said second group of frequency sensitive means.

14. Apparatus for reception and recordation of an intelligible functional signal as recited in claim 12 wherein said interconnecting means between said second group of tuned frequency sensitive means and said first group of frequency sensitive means includes means for holding said interconnecting means conditioned to permit the second group of frequency sensitive means to control operation of said selecting means in response to a signal tone of said second signal phase for a predetermined time period following cessation of response of one of said first group of tuned frequency sensitive means to its signal tone.

15. The arrangement of claim 13 wherein said apparatus includes means responsive to operation of the relay means of said first group followed by operation of the relay means of said second group to restore said holding means and prepare said apparatus for reception and recording of an immediately following intelligible functional signal.

16. The arrangement of claim 14 wherein said apparatus includes means responsive to operation of the relay means of said first group followed within said predetermined time period by operation of the relay means of said second group to restore said holding means and prepare said apparatus for reception and recording of an immediately following intelligible functional signal.

17. Printing telegraph apparatus for reception and recordation of an intelligible functional signal that is comprised of individual first and second tones constituting first and second signal phases, said apparatus comprising a first group of tuned frequency-sensitive means each responsive to a different signal tone of said first signal phase, a second group of tuned frequency-sensitive means each responsive to a different signal tone of said second signal phase, a signal-recording mechanism including signal-selecting members and means for recording the selected signal, first-phase electric circuit means distinctively operable in response to the receipt of a first-phase signal tone to which one of said first group of frequency-sensitive means responds, second-phase electric circuit means distinctively operable in response to the receipt of a second-phase signal tone to which one of said second group of frequency-sensitive means responds, means connecting said first and second-phase electric circuit means to control operation of said signal-selecting members in accordance with the distinctive operation of said first-phase electric circuit means followed directly by the distinctive operation of said second-phase electric circuit means, and means responsive to operation of said first-phase electric circuit means followed by operation of said second-phase electric circuit means to restore and prepare said apparatus for reception and recording of an immediately following intelligible functional signal.

18. Printing telegraph apparatus for reception and recordation of an intelligible functional signal that is comprised of individual first and second tones constituting first and second signal phases, said apparatus comprising a first group of tuned frequency-sensitive means each responsive to a different signal tone of said first signal phase, a second group of tuned frequency-sensitive means each responsive to a different signal tone of said second signal phase, a signal-recording mechanism including signal-selecting members and means for recording the selected signal, first-phase electric circuit means distinctively operable in response to the receipt of a first-phase signal tone to which one of said first group of frequency-sensitive means responds, second-phase electric circuit means distinctively operable in response to the receipt of a second-phase signal tone to which one of said second group of frequency-sensitive means responds, means connecting said first and second-phase electric circuit means to control operation of said signal-selecting members in accordance with the distinctive operation of said first-phase electric circuit means followed directly by the distinctive operation of said second-phase electric circuit means, and means interconnecting said first and second-phase electric circuit means to render the second-phase electric circuit means ineffective to control operation of said selecting members in the absence of prior operation of said first-phase electric circuit means.

19. Printing telegraph apparatus for reception and recordation of an intelligible functional signal that is comprised of individual first and second tones constituting first and second signal phases, said apparatus comprising a first group of tuned frequency-sensitive means each responsive to a different signal tone of said first signal phase, a second group of tuned frequency-sensitive means each responsive to a different signal tone of said second signal phase, a signal-recording mechanism including signal-selecting members and means for recording the selected signal, first-phase electric circuit means distinctively operable for a limited time interval in response to the receipt of a first-phase signal tone to which one of said first group of frequency-sensitive means responds, second-phase electric circuit means distinctively operable in response to the receipt of a second-phase signal tone to which one of said second group of frequency-sensitive means responds, means connecting said first and second-phase electric circuit means to control operation of said signal-selecting members in accordance with the distinctive operation of said first-phase electric circuit means followed within said limited time interval by the distinctive operation of said second-phase electric circuit means, means interconnecting said first and second-phase electric circuit means to render the second-phase electric circuit means ineffective to control operation of said selecting members in the absence of prior operation of said first-phase electric circuit means, and means responsive to operation of said first-phase electric circuit means followed within said limited time interval by operation of said second-phase electric circuit means to restore the first-phase electric circuit means and prepare said apparatus for reception and recording of an immediately following intelligible functional signal.

20. Printing telegraph apparatus for reception and recordation of an intelligible functional signal that is comprised of individual first and second tones constituting first and second signal phases, said apparatus comprising a plurality of punch-selecting solenoids, a tape-perforating solenoid, a first group of tuned frequency-sensitive means each responsive to a different signal tone of said first signal phase, a second group of tuned frequency-sensitive means each responsive to a different signal tone of said second signal phase, first-phase electric circuit means distinctively operable in response to the receipt of a first-phase signal tone to which one of said first group of frequency-sensitive means responds for controlling actuation of certain of said punch-selecting solenoids, second-phase electric circuit means distinctively operable in response to the receipt of a second-phase signal tone to which one of said second group of frequency-sensitive means responds for controlling actuation of certain other of said punch-selecting solenoids, means connecting said first and second-phase electric circuit means to actuate said tape-perforating solenoid and thereby operate said punching solenoids in accordance with the distinctive operation of said first-phase electric circuit means followed directly by the distinctive operation of said second-phase electric circuit means, and means responsive to operation of said first-phase electric circuit means followed directly by operation of said second-phase electric circuit means to restore and prepare said apparatus for reception and recording of an immediately following intelligible functional signal.

21. Printing telegraph apparatus for reception and recordation of an intelligible functional signal that is comprised of individual first and second tones constituting first and second signal phases, said apparatus comprising a movable type font, printer-actuating mechanism cooperating with said type font to record selected characters from said type font, a first group of tuned frequency-sensitive means each responsive to a different signal tone of said first signal phase, a second group of tuned frequency-sensitive means each responsive to a different signal tone of said second signal phase, first-phase electric circuit means distinctively operable in response to the receipt of a first-phase signal tone to which one of said first group of frequency-sensitive means responds for controlling actuation of a solenoid for imparting an initial orienting movement to said type font, second-phase electric circuit means distinctively operable in response to the receipt of a second-phase signal tone to which one of said second group of frequency-sensitive means responds for controlling actuation of a second solenoid for imparting a final orienting movement to said type font, means connecting said first and second-phase electric circuit means to actuate said type font and thereby operate said solenoids in accordance with the distinctive operation of said first-phase electric circuit means followed directly by the distinctive operation of said second-phase electric circuit means, and means responsive to operation of said first-phase electric circuit means followed directly by operation of said second-phase electric circuit means to restore and prepare said apparatus for reception and recording of an immediately following intelligible functional signal.

22. A method of transmitting and receiving intelligence characters as two-phase signals which comprises establishing first and second mutually exclusive groups of tones, representing each intelligence character as a distinctive combination of a single tone from the first group and a single tone from the second group, transmitting a selected intelligence character by sequentially transmitting a tone representative of the first phase and a tone representative of the second phase of the selected intelligence character, utilizing said first-phase tone at a receiver to perform one of a plurality of operations necessary to the recording of the intelligence character corresponding to the signal transmitted, and utilizing the second-phase tone to complete the operations necessary to said recording and to restore the receiver for receiving and recording an immediately following intelligence character signal.

23. A method of transmitting and receiving intelligence characters as two-phase signals which comprises establishing first and second mutually exclusive groups of tones, representing each intelligence character as a distinctive combination of a single tone from the first group and a single tone from the second group, transmitting a selected intelligence character by sequentially transmitting a tone representative of the first phase and a tone representative of the second phase of the selected intelligence character, utilizing said first-phase tone for initially conditioning a receiver for recording the signal transmitted and for maintaining such initial conditioning a predetermined listening interval, and utilizing said second-phase tone for finally actuating the initially conditioned receiver for recording the signal transmitted and for restoring the receiver for receiving and recording immediately following intelligence character signals.

No references cited.